United States Patent [19]

Tanaka et al.

[11] Patent Number: 4,985,375

[45] Date of Patent: Jan. 15, 1991

[54] GLASS-CERAMIC ARTICLE AND METHOD FOR ITS PRODUCTION

[75] Inventors: Chikao Tanaka; Setsuro Ito, both of Yokohama; Yasumasa Nakao, Tokyo; Kei Maeda, Yokohama, all of Japan

[73] Assignee: Asahi Glass Company Ltd., Tokyo, Japan

[21] Appl. No.: 190,071

[22] Filed: May 4, 1988

[30] Foreign Application Priority Data

May 7, 1987 [JP] Japan .................. 62-109639

[51] Int. Cl.$^5$ .................. C03C 10/02; C03C 10/04
[52] U.S. Cl. .................. 501/5; 501/10
[58] Field of Search .................. 501/5, 10

[56] References Cited

U.S. PATENT DOCUMENTS 3,497,366  2/1970  Simmons .................. 501/5

FOREIGN PATENT DOCUMENTS 56-104747  8/1981  Japan .

OTHER PUBLICATIONS

*Chemical Abstract*, vol. 90, No. 24, Jun. 1979, p. 285, No. 19139u, PL-A-97 072, (Zaklady Przemyslu Elektronicznego "Kazel").
*Chemical Abstract*, vol. 83, No. 3, Aug. 11, 1975, p. 243, No. 47221b, Columbus, Ohio, U.S.; & JP-A-74 105 815.
*Chemical Abstract*, vol. 107, No. 24, Dec. 14, 1987, pp. 277, No. 221968b, Columbus, Ohio; & JP-A-62 108 742.

*Primary Examiner*—Mark L. Bell
*Attorney, Agent, or Firm*—Oblon, Spivak, McClelland, Maier & Neustadt

[57] ABSTRACT

A method for producing a glass-ceramic article, which comprises crystallizing a glass article consisting essentially of from 40 to 60% by weight of $SiO_2$, from 13 to 19% by weight of $Al_2O_3$, from 0 to 6% by weight of $B_2O_3$, from 8 to 16% by weight of MgO, from 2 to 6% by weight of CaO, from 3 to 9% by weight of ZnO, from 5 to 12% by weight of $TiO_2$, from 0 to 3% by weight of $Li_2O+Na_2O+K_2O$, from 0 to 3% by weight of $P_2O_5$ and from 0 to 2% by weight of $ZrO_2$.

2 Claims, No Drawings

GLASS-CERAMIC ARTICLE AND METHOD FOR ITS PRODUCTION

The present invention relates to a glass-ceramic article, a method for its production and a method of its use.

Heretofore, natural stone has been used mainly as a material for interior and exterior walls of buildings. However, in recent years, it has been common to use glass-ceramic articles having superior properties such as mechanical strength as compared with the natural stone.

Japanese Unexamined Patent Publication No. 104747/1981 discloses a glass-ceramic article which is produced by heating a glass article composed essentially of from 40 to 60% by weight of $SiO_2$, from 15 to 25% by weight of $Al_2O_3$, from 0 to 12% by weight of MgO, from 0 to 12% by weight of ZnO, from 3 to 15% by weight of MgO+ZnO, from 1 to 5% by weight of $TiO_2$, from 2 to 10% by weight of $B_2O_3$, from 4 to 13% by weight of $Na_2O$, from 0 to 3% by weight of $ZrO_2$, from 0 to 5% by weight of $K_2O$, from 0 to 5% by weight of CaO, from 0 to 5% by weight of BaO, from 0 to 1% by weight of $As_2O_3$ and from 0 to 1% by weight of $Sb_2O_3$ to precipitate crystals of forsterite ($2MgO.SiO_2$) and gahnite ($ZnO.Al_2O_3$).

However, such a glass-ceramic article can not be made thin since the flexural strength is not adequately high. Further, the Vickers hardness is relatively small, and the surface is susceptible to scratching by mechanical contact. Further, the alkali metal oxide content is relatively large, whereby the chemical durability is poor, and when used as a wall material of a building, the outer appearance tends to gradually deteriorate.

It is an object of the present invention to overcome the above-mentioned drawbacks and to provide a method for producing a glass-ceramic article which can readily be obtained by crystallization for an extremely short period of time, which has strength higher than the conventional glass-ceramic article for building material, which has a low alkali metal oxide content and excellent chemical resistance and which can be crystallized while the shape and the surface condition formed by the glass molding are maintained.

The present invention provides a method for producing a glass-ceramic article, which comprises crystallizing a glass article consisting essentially of from 40 to 60% by weight of $SiO_2$, from 13 to 19% by weight of $Al_2O_3$, from 0 to 6% by weight of $B_2O_3$, from 8 to 16% by weight of MgO, from 2 to 6% by weight of CaO, from 3 to 9% by weight of ZnO, from 5 to 12% by weight of $TiO_2$, from 0 to 3% by weight of $Li_2O+Na_2O+K_2O$, from 0 to 3% by weight of $P_2O_5$ and from 0 to 2% by weight of $ZrO_2$.

Now, the present invention will be described in detail with reference to the preferred embodiments.

In the glass article of the present invention, $SiO_2$, $Al_2O_3$, MgO and ZnO are components for constituting precipitated crystals, and $TiO_2$ is a nuclei-forming agent to precipitate crystals.

$B_2O_3$, CaO, $Li_2O$, $Na_2O$ and $K_2O$ are a flux to facilitate the melting of the glass.

$B_2O_5$ and $ZrO_2$ are not essential components, but they may be added as components to facilitate the formation of nuclei by $TiO_2$ in an amount of up to 3% and up to 2%, respectively.

If $SiO_2$ is less than 40% by weight, the chemical resistance of the resulting glass-ceramic article tends to be poor. If it exceeds 60%, it becomes difficult to melt the glass, and the devitrification temperature tends to increase.

If $Al_2O_3$ is less than 13% by weight, crystallization tends to be difficult, and if it exceeds 19% by weight, it tends to be difficult to melt the glass and the devitrification temperature tends to increase.

If $B_2O_3$ exceeds 6% by weight, the deformation during the crystallization tends to be large.

If MgO is less than 8%, crystallization tends to be difficult, and if it exceeds 16% by weight, the devitrification temperature tends to increase.

If CaO is less than 2% by weight, the devitrification temperature tends to increase, and if it exceeds 6% by weight, crystallization tends to be difficult and crystals are likely to precipitate on the surface, and the surface gloss tends to be lost during the crystallization.

If ZnO is less than 3% by weight, crystallization tends to be difficult, and if it exceeds 9%, the devitrification temperature tends to increase.

If $TiO_2$ is less than 5% by weight, crystallization tends to be difficult, and it becomes difficult to maintain the shape during the crystallization. If it exceeds 12% by weight, the devitrification temperature tends to increase.

$Li_2O$, $Na_2O$ and $K_2O$ are effective as a flux, but if the total amount exceeds 3% by weight, it tends to be difficult to maintain the shape during the crystallization, and the chemical durability and devitrification tend to deteriorate.

If $P_2O_5$ exceeds 3% by weight, the deformation during the crystallization tends to increase.

If $ZrO_2$ exceeds 2% by weight, the melting properties tend to be poor, and the devitrification temperature tends to increase.

The glass article preferably consists essentially of from 45 to 53% by weight of $SiO_2$, from 14 to 17% by weight of $Al_2O_3$, from 1 to 5% by weight of $B_2O_3$, from 11 to 16% by weight of MgO, from 3 to 6% by weight of CaO, from 5 to 8% by weight of ZnO, from 7 to 11% by weight of $TiO_2$, from 0 to 2% by weight of $Li_2O+Na_2O+K_2O$ and from 0 to 1% by weight of $ZrO_2$.

In the glass article of the present invention, the total amount of the above-mentioned components may be at least 95% by weight, and the rest of up to 5% by weight may be constituted by one or more of other components including a clarifier such as F, $SO_3$, $As_2O_3$ or $Sb_2O_3$, a coloring agent such as NiO, $Cr_2O_3$, $Fe_2O_3$, CoO, MnO or $V_2O_5$, etc.

In the present invention, the glass article is prepared by blending starting materials to have the above composition, heating and melting the mixture for vitrification, and molding the vitrified melt into a predetermined shape. The heating temperature for vitrification is usually at a level of from 1400 to 1500° C., and the temperature for molding is at a level of from 1250° to 1350° C. The molding method may be a pressing method, a roll out method, or a float method.

On the other hand, the crystallization treatment of such a glass article is conducted by maintaining the glass article at a temperature of from 900° to 1100° C. for from 0.5 to 1 hours. Further, in this crystallization treatment, the temperature can be raised at an extremely high rate at a level of from 200° to 300° C./hr if the thickness is about 8 mm.

There is no particular restriction as to the atmosphere for the crystallization treatment. The crystallization may be conducted in a normal air. Crystals precipitated by such crystallization treatment are enstatite (MgO.-SiO$_2$), gahnite (ZnO.Al$_2$O$_3$) and rutile (TiO$_2$).

The crystallinity of the glass-ceramic article thus produced is at a level of from 20 to 30% by weight. Such a glass-ceramic article has high flexural strength and high Vickers hardness and thus has excellent chemical durability, as will be described hereinafter. Further, according to the present invention, the dimensional change during the crystallization treatment is extremely small. For instance, when a glass material having a surface is subjected to crystallization treatment, it is possible to obtain a glass-ceramic article having substantially the same surface.

Now, the present invention will be described in further detail with reference to Examples. However, it should be understood that the present invention is by no means restricted by such specific Examples.

EXAMPLES 1 TO 11 AND COMPARATIVE EXAMPLE 1

Starting materials are mixed to obtain a desired composition as identified in Table 1. By using a platinum crucible, this mixture was heated and melted at a temperature of from 1450° to 1500° C. for from 3 to 4 hours. During the melting, the mixture was stirred for from 1 to 2 hours by inserting a platinum stirrer to obtain a uniform molten glass. Then, the molten glass was cast and molded into a sheet, which was gradually cooled to obtain a glass article having a thickness of 8 mm. The composition of this glass article is shown in Table 1.

This glass article was put in an electric furnace, heated at a temperature raising rate of as high as 300° C./hr, then maintained at a predetermined crystallization temperature for about 1 hour and then cooled at an average rate of 100° C./hr to obtain a glass-ceramic article i.e. crystallized glass.

The glass-ceramic article was tested for the surface gloss, the flexural strength, the Vickers hardness and the acid resistance. The results are shown in Table 1. In Table 1, the temperature raising rate and the crystallization temperature are also presented, and a Comparative Example was also given.

As is apparent from the Table, the glass-ceramic article produced by the present invention has an excellent surface gloss and very high flexural strength and Vickers hardness and excellent acid resistance.

Further, as a result of the X-ray diffraction, it was found that in Sample Nos. 1 to 11 of the present invention, precipitated main crystals were enstatite (MgO.-SiO$_2$), gahnite (ZnO.Al$_2$O$_3$) and rutile (TiO$_2$), and the crystallinity was about 30% by weight. Whereas in the Comparative Example, main crystals were gahnite and forsterite.

The measuring methods were as follows.

Gloss: Evaluated by vidual observation.

Flexural strength: A sample having a thickness t of 3 mm, a width w of 4 mm and a length of 50 mm was prepared from the glass-ceramic article. This sample was placed on two fulcra spaced with a distance L of 30 mm. Then, a load was exerted at the center between the two fulcra at a rate of 0.5 mm/min, and the load P at the breakage was measured. From the measured value, the flexural strength $\sigma$ was calculated in accordance with the following equation, and an average value of ten samples was shown in Table 1.

$$\sigma = \frac{3PL}{2wt^2}$$

Vickers hardness: A diamond pyramid indenter having an angle between the opposite faces of 136° was pressed against the surface of the glass-ceramic article under a load of 0.1 kg for 15 seconds, whereupon the Vickers hardness was obtained by dividing the load by the surface area of the dent formed by the indenter and calculated in accordance with the following equation.

$$\frac{2P \sin l/2(136°)}{d^2} = \frac{1.854P}{d^2} \text{ (kg/cm}^2\text{)}$$

where P is the load (kg) and d is the diagonal line (mm) of the dent.

Acid resistance: A test piece of 15×15×10 mm was immersed in a 1%H$_2$SO$_4$ aqueous solution at 25° C. for 650 hours, and then the weight reduction was measured, and it was divided by the surface area of the sample to obtain a value, which is indicated in the Table.

EXAMPLE 11

A test piece of 5×5×50 mm was prepared from the glass article of Sample No. 11 as identified in Table 1. This test piece was put in an electric furnace and supported with a span of 40 mm. Then, the test piece was heated at a rate of 200° C./hr, maintained at 1000° C. for 1 hour for crystallization, and then cooled at a rate of 100° C./hr. The glass-ceramic article (i.e. crystallized glass) thus obtained had an extremely small amount of deformation with a substantially arcuate deformation with a deflection of the central portion from both end portions being about 1.3 mm.

On the other hand, a similar test was carried out with respect to the glass article of Comparative Example 1 as identified in Table 1, except that for the crystallization of this test piece, the test piece was heated at a rate of 100° C./hr and maintained at 1000° C. for 1 hour. The glass-ceramic article thereby obtained had an extremely large amount of deformation with the glass deformed substantially vertically from the supported portions.

TABLE 1

| | Example No. | | | | | | | | | | | Comparative Example |
|---|---|---|---|---|---|---|---|---|---|---|---|---|
| | 1 | 2 | 3 | 4 | 5 | 6 | 7 | 8 | 9 | 10 | 11 | |
| SiO$_2$ | 52.1 | 46.4 | 53.4 | 46.0 | 55.9 | 49.0 | 51.6 | 51.6 | 43.0 | 58.0 | 50 | 53 |
| Al$_2$O$_3$ | 15.9 | 16.9 | 16.3 | 16.8 | 14.6 | 16.3 | 15.8 | 15.7 | 18.0 | 18.0 | 16.6 | 18 |
| B$_2$O$_3$ | 2.5 | 4.8 | | 1.0 | 2.3 | 2.5 | 2.4 | 1.2 | 1.0 | | 2.6 | 8 |
| MgO | 11.9 | 12.6 | 12.2 | 12.5 | 11.0 | 12.2 | 9.5 | 11.8 | 15.0 | 11.0 | 12.4 | 5 |
| CaO | 4.0 | 4.2 | 4.1 | 4.2 | 3.7 | 4.1 | 5.9 | 3.9 | 3.0 | 3.0 | 4.2 | — |
| ZnO | 5.8 | 5.6 | 5.9 | 9.0 | 5.3 | 5.9 | 5.7 | 5.7 | 4.0 | 4.0 | 6.0 | 4 |
| LiO$_2$ | | | | | | 0.5 | | | | | | |
| Na$_2$O | | | | 1.5 | | | | | | 2.0 | | 7 |
| K$_2$O | | | | | | 1.5 | | | | | | 2 |
| ZrO$_2$ | | | | 0.5 | | | | | | 1.0 | | |
| P$_2$O$_5$ | | 1.0 | | | | | | | | 2.0 | | |

TABLE 1-continued

|  | Example No. | | | | | | | | | | | Comparative Example |
|---|---|---|---|---|---|---|---|---|---|---|---|---|
|  | 1 | 2 | 3 | 4 | 5 | 6 | 7 | 8 | 9 | 10 | 11 | 3 |
| $TiO_2$ | 7.9 | 8.4 | 8.1 | 8.4 | 7.3 | 8.1 | 9.1 | 10.1 | 11.0 | 6.0 | 8.3 | |
| Temp. raising rate (°C./hr) | 300 | 300 | 300 | 300 | 300 | 300 | 300 | 300 | 250 | 200 | 300 | 100 |
| Crystallization temp. (°C.) | 1000 | 1000 | 1000 | 1000 | 1000 | 1000 | 1000 | 1000 | 960 | 1050 | 1000 | 1000 |
| Gloss | Yes | Yes | Yes | Yes | Yes | Yes | Yes | Yes | Yes | Yes | Yes | Yes |
| Flexural strength (kg/cm$^2$) | 2000 | 1500 | 2000 | 1600 | 1800 | 2000 | 1900 | 1700 | 1700 | 1500 | 2000 | 1200 |
| Vickers hardness (kg/mm$^2$) | 700 | 710 | 670 | 680 | 700 | 670 | 680 | 700 | 680 | 650 | 700 | 510 |
| Acid resistance (mg/cm$^2$) | 0.01 | 0.04 | 0.01 | 0.05 | 0.01 | 0.05 | 0.03 | 0.02 | 0.06 | 0.01 | 0.04 | 0.72 |

The method for the production of a glass-ceramic article according to the present invention has a feature that the crystallization treatment can be conducted in a short period of time and the crystallization can be conducted while maintaining the shape of the glass article to be treated. Accordingly, it is readily possible to produce a glass-ceramic article having a mold pattern by imparting the mold pattern on the surface of a glass article by e.g. roll out molding, followed by crystallization. Otherwise, it is possible to produce an article having a special shape by e.g. press molding without requiring finishing treatment such as grinding or polishing.

Further, the crystallization can be conducted without deformation, and it is possible to conduct the crystallization without using mold frames or shelf plates. Accordingly, it is possible to establish an on-line ceramic producing process wherein the crystallization step follows directly from the molding step.

Further, the surface treatment such as polishing or roughening can be conducted to the glass article which can readily be treated with a relatively low hardness prior to the crystallization treatment, and yet after the crystallization, the formed glass-ceramic article has a hardness higher than the natural stone and thus has a merit that it is hardly susceptible to scratching during the use.

The product is highly resistant against breakage since the strength is high, and it can be made into a large sheet or a thin sheet. These properties are excellent characteristics which can not be found in the conventional glass-ceramic building materials. Further, the crystallization rate is higher by from 2 to 3 times than the conventional glass-ceramic articles. Therefore, there is a substantial economical merit in that the time of the crystallization step can be shortened.

Further, the produced glass-ceramic article has excellent chemical resistance, and the excellent properties such that outer appearance hardly deteriorate. Since it has high flexural strength and Vickers hardness, it can be made into a thin sheet with its surface highly resistant against scratching, and thus it is particularly suitable for use as a wall material for the interior and exterior walls of buildings.

What is claimed is:

1. A glass-ceramic article produced by crystallizing an admixture consisting essentially of from 45 to 53% by weight $SiO_2$, from 14 to 17% by weight of $Al_2O_3$, from 1 to 5% by weight of $B_2O_3$, from 11 to 16% by weight of MgO, from 3 to 6% by weight of CaO, from 5 to 8% by weight of ZnO, from 7 to 11% by weight of $TiO_2$, from 0 to 2% by weight of $Li_2O+Na_2O+K_2O$ and from 0 to 1% by weight of $Zro_2$.

2. The glass-ceramic article according to claim 1, wherein the main crystals which are precipitated within the glass-ceramic article are enstatite ($MgO.SiO_2$), gahnite ($ZnO.Al_2O_3$) and rutile ($TiO_2$).

* * * * *